Patented Sept. 10, 1946

2,407,589

UNITED STATES PATENT OFFICE 2,407,589

AQUEOUS ALKALINE REACTING CLEANING BATH HAVING REDUCED FOAMING CHARACTERISTICS

Henry Earl Tremain and Leslie R. Bacon, Wyandotte, Mich., assignors to Wyandotte Chemical Corporation, Wyandotte, Mich., a corporation of Michigan No Drawing. Application February 3, 1944, Serial No. 520,960

5 Claims. (Cl. 252—156)

This invention relates to the suppression of foaming in aqueous alkaline solutions, and more particularly to the suppression of foaming in impure alkaline washing solutions upon agitation by the addition thereto of small amounts of certain organic materials.

Due to the introduction of the hydraulic type bottle washer, the problem of foaming of the alkaline solution used is more often encountered. This foaming difficulty is attributable to the tremendous agitation produced. Whenever foam overflows and is lost down the sewer, this loss increases the necessary alkali make-up and thus the cost of bottle washing, quite aside from a variety of other inconveniences and dangers. Because this type bottle washer is of considerable importance and the materials known to the prior art have not been entirely satisfactory, the finding of an additive functioning efficiently as a foam suppressor has remained a problem. However, the tendency to foam of alkali solutions is not restricted to any particular mechanical or hydraulic system, but exists wherever foreign matter such as proteins, fats, soaps and surface active agents in general are present and there is opportunity for air or other gases to be entrapped.

Furthermore, the quantity of foam formed increases the longer such solutions are in use because increased amount of foam promoters are accumulated from the dirty or used objects. The tendency to foam is influenced by conditions other than the amount of agitation and quantity of foaming promoters present. In general an increase in the temperature increases the difficulty of suppressing foam; and an increase in alkali concentration assists in suppression of foam or froth. Likewise an increase of suppressor concentration increases, without exception, the effectiveness of foam abatement, up to the minimum needed to effect complete suppression.

More or less definite minimum quantities of foam suppressing agents are required to effect suppression under any given circumstances. Larger quantities are of value only as they serve to maintain a reserve against depletion by chemical reaction, evaporation, mechanical carry-out by adherence to surfaces of moving machine parts or containers traversing the foam inhibited liquid, splashing or other causes. Accordingly, it is generally very advisable that a working reserve in excess of said minimum be provided and adequately maintained, the reserve commonly being greater with increased temperatures to provide against increased losses by evaporation and chemical reaction.

The alkaline constitution has considerable bearing on the foaming behavior, and is especially marked in the case of alkali phosphates. A concentration of 1.6 to 2.3% $P_2O_5$, by analysis, in the caustic frequently is sufficient to cause excessive foaming. Little decay of the foam occurs in several minutes of quiescence after the formation. The presence of large proportions of soda ash or small amounts of sodium sulfate and -silicates in caustic alkali is responsible for somewhat similar foaming behavior.

The object of the invention is to provide a new type of anti-foamer additive for an aqueous solution containing alkaline compounds to allay foaming or to hold in check and suppress the tendency to foam, or to change the character of foam being formed into a less stable type. It is also an object of this invention to provide aqueous alkaline baths containing anti-foamer, which foam to a much lesser extent under operating conditions than said baths without these additives. It is, furthermore, an object to clean glassware or dishes, metallic and other objects by contacting them with an aqueous alkali solution containing foam suppressing additives to offset the presence of colloidal or other extraneous materials tending to produce foams upon agitation. More particularly, it is an object to employ the anti-foamers described herein in machines such as mechanical dish washers, bottle washers or metal parts washers to control objectionable foaming behavior arising from the presence of contaminations derived from the objects contacted by the alkaline wash water.

Other objects of the invention in part will be obvious and in part will appear hereinafter.

It has been proposed to prevent foaming by adding such materials as octyl alcohol (C. A. 16,1254), caprylic alcohol (C. A. 12,1058), oleyl and other high alcohols and mineral oils to prevent the foaming of various types of solutions. There are disadvantages to using these materials in alkali solutions. The simple alcohols are changed chemically by the alkaline medium and are consequently effective for only a relatively short life only. Not only is there a lesser concentration of the initial alcohols, but the products of the chemical reaction promote foaming. Mineral oils are objectionable in the beverage or food industries because of difficult rinsibility and the odor and taste left upon bottles or other wares. Furthermore, these compounds are in part volatile and their effect is only temporary.

We have found that an ideal foam inhibitor should possess the following necessary qualifications, but these alone are not sufficient:

(1) Insolubility or very low solubility in the foaming solution, i. e. form a recognized separate phase
(2) Liquidity at temperature employed
(3) Non-reactivity in the washing medium and non-destructibility to an ineffectual material or a positive foamer It should have good spreading and rinsing properties under the conditions of use. Furthermore, from the practical standpoint of the food and beverage industries, it should be non-odorous, non-toxic and communicate no repulsive taste via the cleansed wares to food products.

Applicants have found as a result of much experimentation and testing that di-tertiary-amylphenoxyethanol, p-tertiary-amylphenoxyethanol and diamyl phenol which are thus characterized, possess exceptional foam inhibiting power for aqueous alkaline solutions even when used in very small quantities. They are each particularly adapted for hydraulic type bottle washing, wherein excessive foaming from contaminated alkali wash water is usually encountered. Of these three materials the preferred is di-tertiary-amylphenoxyethanol. However, applicants have found that when a 50–50 by weight mixture of trioctyl phosphate with di-tertiary-amylphenoxyethanol was employed, the inhibiting action was about one-third less effective than with the use of the latter alone as the anti-foamer. These aforesaid compounds are effective when employed in conjunction with either tetradecanol or trioctyl phosphate, which latter compounds are known foam inhibitors.

In determining the efficiency and behavior of these inhibitors under various operating conditions, several materials considered as representative of contaminants to be found in actual commercial alkaline wash liquids were selected as foam promoters. Sodium hydroxide, sodium carbonate and tetrasodium pyrophosphate are representative alkaline chemical compounds employed in such commercial alkaline washing solutions. As representative contaminants there were selected evaporated milk (commercial brand), Foamite (a natural vegetable product manufactured by American-LaFrance Foamite Corporation), wheat flour (commercial brand), Nacconol N. R. (wetting agent understood to be keryl benzene sodium sulfonate), and an alkali oleate soap.

Three standard foaming solutions were prepared by mixing the following materials and refluxing at boiling temperature for one hour:

| | | |
|---|---|---|
| Evaporated milk | grams | 1.603 |
| Foamite | do | 5.460 |
| Flour | do | 4.820 |
| Nacconol N. R. | do | 0.045 |
| Oleate soap | do | 0.069 |
| Caustic soda | do | 24.0 |
| Water | ml | 800.0 |

This mixture was divided into three equal portions and treated as follows:

Portion 1—diluted to 800 ml.
Portion 2—16 grams of caustic soda added and diluted to 800 ml.
Portion 3—32 grams of caustic soda added and diluted to 800 ml.

The three solutions then comprise respectively, approximately 1, 3 and 5% (all percentages herein stated being by weight unless otherwise stated) solutions of the caustic alkali, each containing a total of 0.5% of the mixed foaming components. These foaming systems differ only in concentration of alkali.

Tests

The various materials tested for foam suppression properties were made up for use as 20% solutions in acetone.

50 ml. portions of each alkali solution were introduced into 125 ml. Pyrex Erlenmeyer flasks. The properties quantities of foam inhibitors were added, the flasks stoppered and placed in a forced draft air oven. At the end of 24, 48 and 72 hours the flasks were removed in conveniently sized groups, agitated and foam observations made at the end of 10 seconds and 5 minutes after shaking. The observations were recorded in terms of "Excellent," "Good," "Fair," "Poor" and "Bad." "Poor" defines the foaming tendencies of portion 2 supra in a 3% pure caustic solution. "Bad" applies to any system foaming to a greater extent than standard foamer A. "Fair" represents the degree where the foaming is no more than half that of the standard. "Good" represents the degree of foaming, wherein the surface of the solution is only partly covered with foam. "Excellent" signifies that all foam is inhibited or instantly destroyed.

A large number of known anti-foaming materials were examined, but did not qualify under conditions of the above test within 24 hours at 140° F. Only those materials were retained for consideration which rated "good" or "excellent" on this test. Among the materials so dismissed were iso-amyl phthalate, tributyl phosphate, n-amyl alcohol, benzyl alcohol, heptadecanol, resorcinol, benzyl chloride, butyl Cellosolve laurate, butyl Cellosolve palmitate, dibutyl phthalate, diphenyl phosphate, tricresyl phosphate, triphenyl phosphate, diphenyl and diamylnaphthalene. Tetradecanol, i. e. 7-ethyl-, 2-methyl-undecanol-, 4 - ditertiary - amylphenoxyethanol and trioctyl phosphate survived the test.

The following examples in Table I are set out as illustrations of the present invention. However, they are not presented with the intention of limiting the scope of the invention, since many variations may be made.

Table I.—*Comparison of foam inhibitors on 3% solutions of alkali (72% NaOH 28% Na₂CO₃) with 0.5% addition of mixed foamers at 160° F.*

| Foam inhibitor | Hours held after foam inhibitor addition | Percent foam inhibitor added to solution | | | | | | | |
|---|---|---|---|---|---|---|---|---|---|
| | | 0.00 | | 0.01 | | 0.025 | | 0.05 | |
| | | Foam decay period | | Foam decay period | | Foam decay period | | Foam decay period | |
| | | 10 sec. | 5 min. | 10 sec. | 5 min. | 10 sec. | 5 min. | 10 sec. | 5 min. |
| None | 24 | P¹ | P | "Portion 2" | | | | | |
| | 48 | P | P | | | | | | |
| | 72 | P | P | | | | | | |
| None | 24 | B² | B | | | | | | |
| | 48 | B | P | | | | | | |
| | 72 | B | P | | | | | | |
| Light mineral oil | 24 | | | P | P | P | P | P | P |
| | 48 | | | P | P | P | P | P | P |
| | 72 | | | P | P | P | P | P | P |
| Tetradecanol | 24 | | | F³ | F | P | F | E⁵ | E |
| | 48 | | | P | P | P | P | P | P |
| | 72 | | | P | P | P | P | P | P |
| Di-tertiary-amylphenoxy-ethanol | 24 | | | G⁴ | G | G | G | G | G |
| | 48 | | | F | G | F | G | F | G |
| | 72 | | | F | F | F | F | F | G |
| Trioctyl phosphate | 24 | | | P | P | P | P | G | E |
| | 48 | | | P | G | P | G | G | E |
| | 72 | | | P | F | P | F | G | E |

¹ P—Poor.  ² B—Bad.  ³ F—Fair.  ⁴ G—Good.  ⁵ E—Excellent.

Under the conditions represented by the foregoing table it is seen that the carbonated alkali presents a more difficult foam control problem than a caustic soda solution of equal concentration by weight. Where a light mineral oil was added to the carbonated alkali, after 24 hours or longer, there resulted an unsatisfactory inhibition under all conditions, although some benefit over the entirely uninhibited condition. Tetradecanol shows improved results over mineral oil, especially at the higher concentrations, but the effect is transient. Trioctyl phosphate at this temperature is generally more effective than tetradecanol after 48 and 72 hours, but slower in anti-foaming action than di-tertiary-amylphenoxyethanol at the same lower concentrations. This latter material shows a more comprehensive pattern of general effectiveness under varied conditions of use.

This same more general pattern of effectiveness is further shown by the examples of Table II in which an alkali of different composition is employed over a considerable temperature range.

Various combinations of the foam inhibitors forming applicants' invention described herein can be employed with each other. Also these foam inhibitors are well suited to be employed in association with one or more of the previously known foam inhibitors. By such combinations an inhibitor composition can be offered having activity over a wide range of operating conditions and over a long period of time. Also if acquainted in advance of concentration of alkali or alkaline salts in the solutions to be treated, or of the nature of the foaming constituents, those inhibitors or combination of inhibitors most effective for specific conditions can be recommended.

For a low alkali range, for example up to 1%, an inhibitor composed of 50% tetradecanol and 50% di-tertiary-amylphenoxyethanol has proven to be very effective. For high temperatures and a stronger alkali concentration, for example 3–5%, a mixture of trioctyl phosphate and di-tertiary-amylphenoxy-ethanol is excellent. For low temperature operation, a mixture of equal Table II.—*Comparison of foam inhibitors on 1% solutions of alkali (95% NaOH + 5% tetrasodium pyrophosphate) using 0.5% addition of mixed foamers and 0.025% foam inhibitor*

| Foam inhibitor | Hours held after foam inhibitor addition | 120° F. | | 140° F. | | 160° F. | |
|---|---|---|---|---|---|---|---|
| | | Foam decay period | | Foam decay period | | Foam decay period | |
| | | 10 sec. | 5 min. | 10 sec. | 5 min. | 10 sec. | 5 min. |
| None | 24 | B¹ | B | B | P² | B | B |
| | 48 | B | P | B | P | B | B |
| | 72 | P | P | P | P | B | P |
| Light mineral oil | 24 | B | B | P | P | B | P |
| | 48 | B | B | P | P | B | P |
| | 72 | B | B | P | P | B | P |
| Tetradecanol | 24 | B | B | F³ | F | P | P |
| | 48 | B | B | P | P | P | P |
| | 72 | B | B | P | B | P | P |
| Trioctyl phosphate | 24 | G⁴ | E⁵ | P | P | P | F |
| | 48 | F | G | P | P | P | P |
| | 72 | G | E | P | P | P | P |
| Di-tertiary-amyl-phenoxy-ethanol | 24 | P | P | F | F | P | F |
| | 48 | P | P | F | F | P | F |
| | 72 | F | F | F | F | F | F |

¹ B—Bad.  ² P—Poor.  ³ F—Fair.  ⁴ G—Good.  ⁵ E—Excellent.

parts of trioctyl phosphate, di-tertiary-amylphenoxyethanol and tetradecanol is very satisfactory.

Laboratory tests under dynamic conditions have shown the marked efficiency of di-tertiary-amylphenoxyethanol by itself and in combination with other materials. To conduct these tests an apparatus was constructed employing a 10 gal. steel drum as a container for a foaming solution, a positive pressure pump for withdrawing solution from the liquid phase near the bottom and delivering same via a number of jets into milk bottles inverted over the solution reservoir. Foaming constituents were employed in the same ratios as hitherto described, but at five fold concentrations, i. e. 10 liters of foaming solutions contained 300 g. of caustic soda, 33.4 g. evaporated milk, 113.7 g. "Foamite," 100.4 g. flour, 0.935 g. "Nacconol NR" and 1.465 g. sodium oleate. 10 ml. of the anti-foamer was employed (0.1% approximately). Foam was allowed to develop close to the point of overflowing the container prior to addition of the anti-foamer. Under these circumstances a 50-50 mixture of di-tertiary-amylphenoxyethanol and trioctyl phosphate suppressed or caused complete decay of the standing foam within about one to four minutes operation of the system at 20 lb. pump pressure and 140° F. solution temperature. This addition effectively suppressed foam for about 11½ hours of continuous operation, failing rather abruptly within about 15 minutes after the first foam appeared. A check run failed in 11 hours and 55 minutes. Two runs using straight di-tertiary-amylphenoxyethanol failed at 17 and 17¼ hours respectively. Trioctyl phosphate, therefore, depreciated the performance of di-tertiary-amylphenoxyethanol alone.

P-tertiary-amylphenoxyethanol under similar conditions failed at 2¾ hours, but 10 ml. addition of the same inhibitor extended foam suppression for several fold this period.

Tests conducted under practical milk bottle washing conditions have shown that as little as 20 cc. of the 50-50 mixture of di-tertiary-amylphenoxyethanol and trioctyl phosphate added at intervals of 1 to 1¼ hours to 625 gal. of a 3½% caustic test solution of a 72% NaOH—28% $Na_2CO_3$ bottle washing alkali in 13 gr. hardness water and operating at 115-135° F. and 15-18 lb. pump pressure were sufficient to deal with an extremely difficult foaming problem.

In another plant also using a "soaker-hydro" type machine and a very difficult alkali from the foam suppression viewpoint (adding one part of an alkali polyphosphate to 6-7 parts of a 95% caustic—5% tetrasodium pyrophosphate solution held at 3% caustic test and 140° F.), excellent foam suppression resulted from the addition of 1 pint of the same 50-50 mixture to about 350 gal. of washing solution. Foam suppression was immediate and complete and no adverse results were noted on washing or rinsing performance. This addition was effective for more than 30 hours of operation.

The amount of foam inhibitor to be used in any particular assignment cannot be definitely stated because of the variation of such factors as surface tension of the solution, the area exposed, the temperature, or the violence of agitation. In general, an amount of anti-foamer for aqueous alkaline cleansing solutions for bottle and dish washing of about 0.05%, on the basis of weight of the washing solution is sufficient.

There are various specific applications of the invention other than treating washing solutions, such as the reduction or elimination of foaming in coating solutions for paper finishes, in beater operations for paper making, in glue manufacture and sugar boiling; in each of these, materials of decided alkaline reaction are employed. These foam inhibitors can also be used in alkaline anti-freeze mixture, in alkaline liquors undergoing distillation, in boiler waters, in soap liquors for treating fabrics, in wet method dust collectors, and as a safety control against boiling over of kettles used in soap manufacture.

The above described foam inhibitors function in the various types of aqueous alkaline solutions. They are operative in strongly alkaline mediums in which caustic alkalies may be present and in weakly alkaline solutions. They are of most utility probably in the field of alkaline detergents, especially those containing caustic alkali.

The above description and specific examples are to be construed as illustrative only and not as limiting the scope of the invention. Any modifications or variations therefrom which conform to the invention are intended to be included in the scope of the claims.

We claim:

1. An aqueous alkaline solution having reduced foaming characteristics containing in addition to water, a soluble alkaline agent, and a constituent tending to produce foam, admixed with a minimum of .01% by weight of at least one foam inhibitor selected from the group consisting of di - tertiary - amylphenoxyethanol, p-tertiary-amylphenoxyethanol and diamyl phenol.

2. An aqueous alkaline-reacting cleaning bath having reduced foaming characteristics containing in addition to water, caustic alkali and at least one constituent tending to produce foam, admixed with a minimum of .01% by weight of at least one foam inhibitor selected from the group consisting of di-tertiary-amylphenoxyethanol, p-tertiary-amylphenoxyethanol and diamyl phenol.

3. An aqueous alkaline-reacting solution having reduced foaming characteristics containing in addition to water, a soluble alkaline compound and a constituent tending to produce foam, admixed with a foam inhibitor composition comprising a mixture of di-tertiary-amylphenoxyethanol and trioctyl phosphate, each of said last-named ingredients being present in the amount of ⅓ to ½ of the entire mixture.

4. An aqueous alkaline-reacting solution having reduced foaming characteristics containing in addition to water, a soluble alkaline compound and a constituent tending to produce foam, admixed with a foam inhibitor composition comprising a mixture of equal parts of di-tertiary-amylphenoxyethanol and trioctyl phosphate.

5. An aqueous alkaline-reacting solution having reduced foaming characteristics containing in addition to water, a soluble alkaline compound and a constituent tending to produce foam, admixed with a foam inhibitor composition the major ingredient of which is di-tertiary-amylphenoxyethanol.

HENRY EARL TREMAIN.
LESLIE R. BACON.